(12) United States Patent
Hinzpeter et al.

(10) Patent No.: US 6,426,458 B1
(45) Date of Patent: Jul. 30, 2002

(54) CONTROL CABINET FOR A TABLET PRESS

(75) Inventors: Jürgen Hinzpeter; Ingo Schmidt, both of Schwarzenbek; Joachim Greve, Pogeez; Jörg Reitberger; Ulrich Gathmann, both of Hamburg; Klaus Peter Preuss, Mölln, all of (DE)

(73) Assignee: Wilhelm Fette GmbH, Schwarzenbek (DE)

( * ) Notice: Subject to any disclaimer, the term of this patent is extended or adjusted under 35 U.S.C. 154(b) by 0 days.

(21) Appl. No.: 09/558,365

(22) Filed: Apr. 26, 2000

(30) Foreign Application Priority Data

Apr. 26, 1999 (DE) .......................................... 199 18 804

(51) Int. Cl.[7] ................................................. H05K 9/00
(52) U.S. Cl. ............................. 174/35 MS; 174/35 GC
(58) Field of Search ......................... 174/35 GC, 35 R, 174/35 MS; 361/816, 818

(56) References Cited

U.S. PATENT DOCUMENTS 5,136,119 A * 8/1992 Leyland ..................... 174/35 R
5,981,927 A * 11/1999 Osepchuk et al. .......... 219/740

FOREIGN PATENT DOCUMENTS

DE          91 06 114         7/1991
DE          41 27467          2/1993

* cited by examiner

*Primary Examiner*—Anthony Dinkins
*Assistant Examiner*—Hung V Ngo
(74) *Attorney, Agent, or Firm*—Vidas, Arrett & Steinkraus, P.A.

(57) ABSTRACT

A control cabinet for a tablet press including an enclosure having wall, ceiling, and bottom portions of sheet metal, a door which closes an opening of the enclosure wherein a door board attached to the enclosure by means of at least one hinge only consists of two panels of a transparent material with no surrounding border between which a netting of a conductive material is disposed, and a contacting device which electrically connects the netting to a portion of the enclosure.

11 Claims, 2 Drawing Sheets

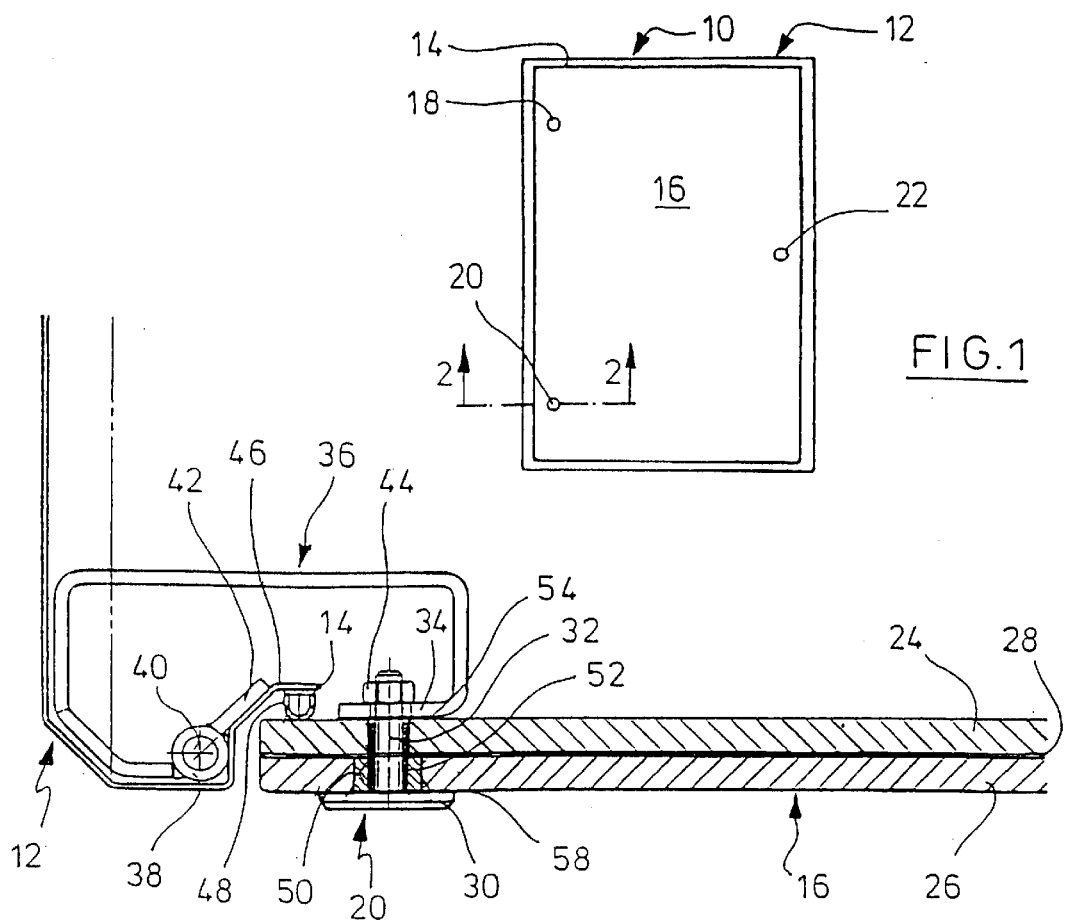
FIG.1
FIG.2
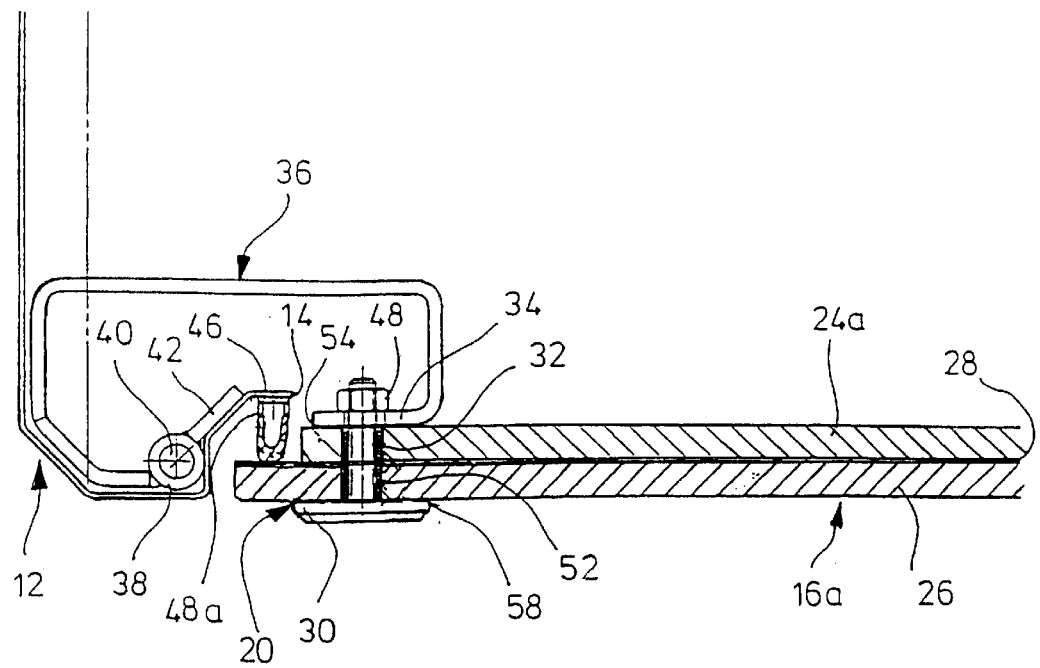
FIG.3

CONTROL CABINET FOR A TABLET PRESS

CROSS-REFERENCE TO RELATED APPLICATIONS

Not Applicable

STATEMENT REGARDING FEDERALLY SPONSORED RESEARCH

Not Applicable

BACKGROUND OF THE INVENTION

This invention relates to a control cabinet for a tablet press.

A system of a tablet pressing device, apart from the tablet press proper and other peripheral devices, includes a control cabinet in which all components and assemblies are contained for the electric activation of the tablet press and peripheral devices. Such control cabinets, as is common, have an enclosure of sheet metal and a door through which the interior of the enclosure and, hence, the individual elements are accessible in the control cabinet. For reasons of safety, the door of the control cabinet is usually closed and may be opened by authorized personnel only. This means, however, that troubles which arise in the control cabinet or are signaled therein are not available for immediate access if the authorized person is not nearby.

Therefore, it is the object of the invention to provide a control cabinet for a tablet press which allows a view into the interior of the control cabinet even when its door is closed, which is shielded against electromagnetic waves, and is easy to clean.

BRIEF SUMMARY OF THE INVENTION

In the inventive control cabinet, the door board is completely of a transparent material. The door board is composed of at least three layers, i.e. two outer layers of sufficiently stable, transparent material such as acrylic glass and a netting of an electrically conductive material interposed between the acrylic glass panels. The netting is structured so as to not essentially prevent a look through the door board. Thus, an operator may readily take a glance at the inter of a control cabinet and see whether certain pilot lamps or the like are responding or signaling an alarm or an error situation.

As mentioned earlier, the door board is assembled from the elements described. A stabilizing border or the like is unnecessary. This has the substantial advantage that the control cabinet may have smooth surfaces continuously extending from outside, which is important for sanitary reasons.

Connected to the netting is a contacting device which links the netting to the enclosure. This usually consists of plate-shaped metal sheets and, hence, of conductive material. Such control cabinets have to be Faraday cages, i.e. to prevent electromagnetic waves from getting into and out of the control cabinet. This shielding action is performed by the netting in the door region with a need to conduct the netting to the enclosure in an electrically conductive manner as was mentioned above.

Several possible constructions are imaginable to connect the netting to the enclosure. According to the invention, one consists in that the inner panel has exposed a strip of the outer panel at its edge which includes the netting, if necessary, and that a contact element is connected to the associated portion of the enclosure which contacts the exposed portion or netting when the door is in its closing position. Preferably, the contact element is formed by a sealing strip of conductive material. It is imaginable to dispose the sealing strip around the whole door opening from inside and to cause it to engage an exposed portion of the netting each. This will only produce a contacting effect when the door is closed, but there will be no protection against electromagnetic radiation when the doors of conventional control cabinets are opened.

A particularly preferred solution according to the invention is that material is cut off from the side of inner panel and from the wire netting by a milling operation so as to expose the adjoining panel. The exposed strip, together with the edge of the panel from which material was milled off, is coated with a layer of a conductive material such as conductive varnish, especially a conductive silver varnish. A sealing strip of a conductive material sealingly engages the conductive layer and simultaneously makes an electric contact therewith. The conductive layer is conductively connected to the netting. Preferably, the sealing strip is formed as a box-like profile so that a wide-area contact is made with the conductive layer. Preferably, the sealing strip is in the hinge region of the door board, but may also be mounted on all of the four sides of the door opening as was explained above.

Alternatively, a pin of electrically conductive material extending through the door board may be provided, which is connected to the door hinge and to the netting, on its part. The pin may be a usual fixing pin which connects the hinge to the door board. For this purpose, the pin extends through a bore of the door board. In another aspect of the invention, an electrically conductive bushing may be disposed in a widened bore portion of one panel, which surrounds the pin and one front-end of which abuts upon the netting and the other end of which abuts upon the head of the pin with the length of the bushing being slightly larger than the thickness of the panel. This presses the bushing against the netting and, in turn, may provide an electric line to the enclosure via the hinge. It is understood that a similar contacting action is provided via the so-called sash fastener. What is normally understood by a sash fastener is a rotary pin having a lateral lug at its inner end, which when closed grips behind an edge of the enclosure, thereby keeping the door in a closed condition.

BRIEF DESCRIPTION OF THE SEVERAL VIEWS OF THE DRAWINGS

Embodiments will now be explained in detail with reference to the drawings.

FIG. 1 shows a front view of the control cabinet according to the invention.

FIG. 2 shows a section through the door region of the control cabinet of FIG. 1 taken along line 2—2.

FIG. 3 shows a representation similar to FIG. 1, but in a modified way of the contacting action.

DETAILED DESCRIPTION OF THE INVENTION

Figure 4:
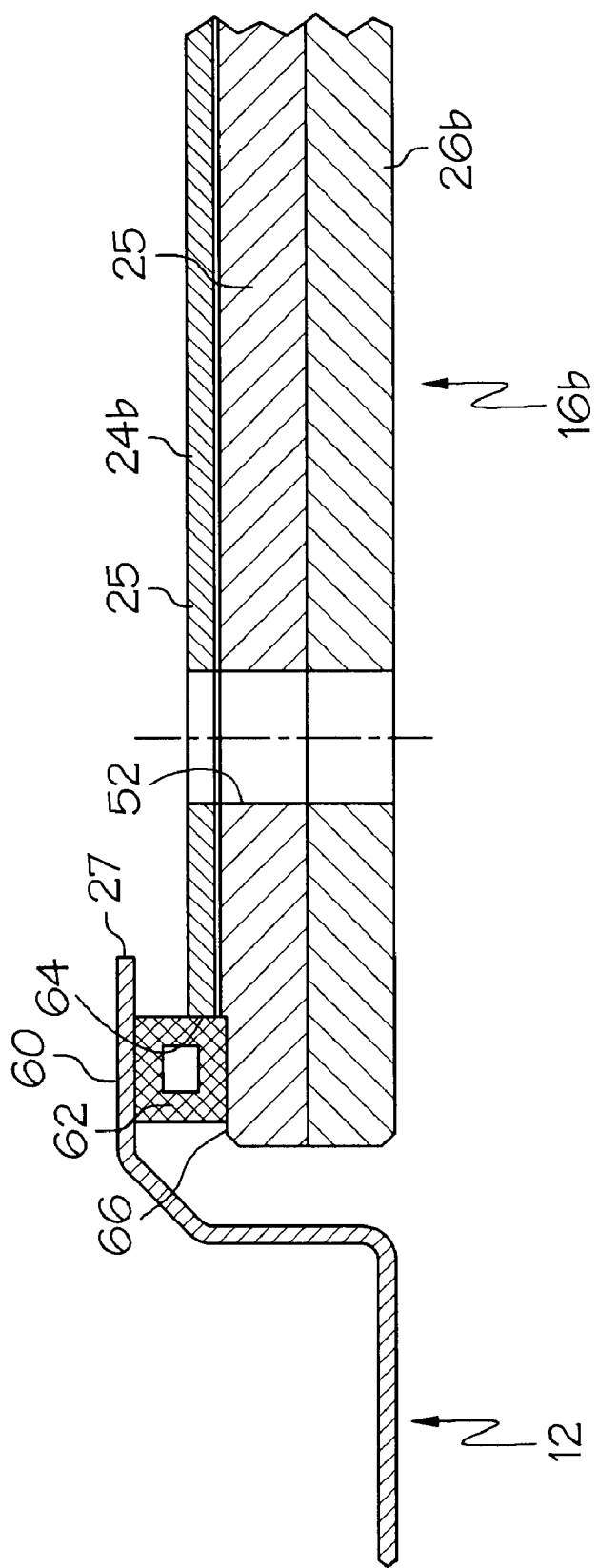
FIG. 4 shows a way of the contacting action modified from that of FIG. 3.

While this invention may be embodied in many different forms, there are described in detail herein a specific preferred embodiment of the invention. This description is an exemplification of the principles of the invention and is not intended to limit the invention to the particular embodiment illustrated.

Referring to FIG. 1, a control cabinet 10 is outlined, which has an enclosure 12 of plate-like sheet metal. The cuboid-shaped cabinet 10 has a front opening 14 that can be closed by a door 16. The door is linked to the enclosure 12 by two hinges on the left-hand side where the fixing pins 18, 20 for fixing the door 16 to the hinges are outlined. A so-called sash fastener is disposed at 22, which can be rotated and has its inner end fitted with a transverse lug which grips behind an edge of the enclosure 12 to lock the door 16.

Referring to FIG. 2, it can be seen that the door 16 consists of two superposed panels 24, 26 which are formed from a transparent material such as acrylic glass. Located between the panels 24, 26 is a netting 28 of a conductive material which, however, does not obstruct a view through the door 16.

It can be seen in FIG. 2 that the pin 20 has a flange-like head 30 and a threaded shank 32 which extends through a bore of the panels 24, 26. The shank 32 also extends through a portion 34 of a box-like profile 36 which has a bearing eyelet 38 close to the opening 14, which is placed on a bearing pin 40 attached to the corresponding wall of the enclosure 12 by means of a plate portion 42. The hinged profile 36 is conformed to the inner contour of the enclosure 12 which, however, is not of particular significance for the present case. A nut 44 secures the portion 34, which extends in parallel with the inside of the panel 24, to the panel 24 so that the door 16 is suspended and may be pivoted from the closing position to the opening position, and vice versa. Only one hinge is illustrated in FIG. 2 while the control cabinet 10 of FIG. 1 has two hinges. The structure of the second one is identical to that of FIG. 2.

Attached to the inwardly-bent portion 46, to which the portion 42 is also fixed, e.g. by welding, is a sealing strip 48 which sealingly interacts with the inside of the inner panel 24. The sealing strip 48 of an elastic material may extend across the whole opening 14 of the cabinet 10. It prevents moisture and dust from entering the interior of the cabinet.

As can be further seen from FIG. 2 a bushing 50 of an electrically conductive material is seated in an widened bore portion of panel 26. The length of the bushing is slightly larger than the thickness of the panel 26 so that it is pressed by the head 30 against the netting 28. The shank 32 is surrounded by a sleeve-shaped sealing 52 which, at its ends, abuts upon flat sealings 54 and 58, respectively, of a conductive material. This connects the netting 28 in an electrically efficient way to the hinge profile 36 which, in turn, is electrically connected to the enclosure 12 which is structured from electrically conductive metal sheets.

In the embodiment of FIG. 3, the parts which are identical to those of FIG. 2 are indicated by the same reference numbers.

Referring to FIG. 3, the inner panel 24a is of smaller dimensions so that a strip of the panel 26 and the netting 28 is exposed. Such a strip may extend around the whole door leaf. A sealing 48a which is attached in a way similar to the sealing 48 of FIG. 2, is larger in height and consists of an electrically conductive material. It electrically contacts the netting 28 when the door is in the closing position as is shown in FIG. 3. Thus, a contact of the netting 28 is established with the enclosure 12 over a large length which may extend around the whole circumferential surface of the door 16a.

In the embodiment of FIG. 4, a door board 16 can be seen which comprises an inner panel 24b, a middle panel 25, and an outer panel 26b. A netting 28 is disposed between the panels 24b and 25. Extending through all panels is a bore 52, which can be passed through by a pin which forms part of a hinge as is shown in FIG. 3 and is described earlier. No further reference should be made thereto. The hinge is appropriately connected to the enclosure 12, which is only slightly outlined in FIG. 4. This is fitted, in the region of the door opening as outlined at 27, with an inwardly-bent border 60 to which a sealing strip 62 box-shaped in cross-section of a conductive material is attached, e.g. by pasting.

As can be further seen from FIG. 4 a recess 64 has been formed by milling off material from the panel 24b and the conductive netting 28, which recess is coated with a conductive layer, e.g. a conductive varnish 66. At this point, the left-hand edge of the panel 24b will be coated, too, so as to connect the layer 66 to the netting 28 in an electrically conductive way. The recess 64, along with the sealing strip 62, is formed such that the sealing strip engages the recess 64 when the door board 16b is closed and comes to lie against the conductive layer 66 on the panel 25 and, simultaneously, against the lateral edge of the panel 24b including the appertaining conductive netting 28. Thus, an efficient electric connection is obtained between the netting 28 and the conductive enclosure 12. The expenditure involved is relatively low. The panels 24b, 25, and 26b are efficiently interconnected with no need for a border or frame. Merely one extra machining operation is required because a strip-shaped portion is milled off from the panel 24b and the netting 28.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A control cabinet for a tablet press, comprising:
   an enclosure (12) having wall, ceiling, and bottom portions of sheet metal;
   a door (16, 16a, 16b) which closes an opening (14, 27) of the enclosure;
   the door being (16, 16a, 16b) attached to the enclosure (12) by means of at least one hinge, and consisting of at least two panels (24, 26, 24a, 24b, 25, 26b), superimposed and of a transparent material without a surrounding border, a netting (28) of a conductive material being disposed between adjacent panels, and
   a contacting device for electrically connecting the netting (28) to a portion of the enclosure (12).

2. The control cabinet according to claim 1, wherein the at least two panels comprise an inner panel (24a, 24b) which is smaller than an adjoining panel (26, 25) and leaves a strip (48a, 62) at the edge of the adjoining panel exposed and a sealing strip (48a, 62) is connected to a portion of the enclosure facing the strip of the adjoining panel, the sealing strip being in a mechanical contact with the exposed strip and in an electric contact with the netting (28) when the door (16a, 16b) is in a closing position.

3. The control cabinet according to claim 2, wherein the netting (28) extends into the strip and the sealing strip (48a) is in a mechanical contact with the netting (28).

4. The control cabinet according to claim 2, wherein the exposed strip is cleared of the netting, and a conductive layer (66) is applied to the exposed strip which is engaged by the sealing strip (62).

5. The control cabinet according to claim 2, wherein the sealing strip (62) is of a rectangular profile.

6. The control cabinet according to claim 2, wherein the inner panel (24b) has an exposed strip (64) which at the edge thereof is formed by milling off material.

7. The control cabinet according to claim 6, wherein a pin (20) extends through the door (16b) and is connected to a hinge (36), the pin (20) electrically connected to the netting (28) with the hinge (36).

8. The control cabinet according to claim 7, wherein the pin (20) simultaneously is a fixing means.

9. The control cabinet according to claim 7, wherein an electrically conductive bushing (52) surrounds the pin (20) in a widened bore of one panel (26) and one front-end of which abuts upon the netting (28) and the other end of which abuts upon a head (30) of the pin (20) with the length of the contact bushing (50) being slightly larger than the thickness of the panel (26).

10. The control cabinet according to claim 9, wherein an electrically conductive sealing (58) is disposed between the head (30) of the pin (20) and the contact bushing (50).

11. A control cabinet for a tablet press, comprising:
- an enclosure having an opening which is closed by a door, the door being attached to the enclosure by at least one hinge;
- the door comprising an inner and outer panel each made of a transparent material between which a conductive netting is disposed, and
- a contacting device which electrically connects the conductive netting to a portion of the enclosure.

* * * * *